United States Patent Office 3,121,070
Patented Feb. 11, 1964

3,121,070
THERMALLY MODIFIED POLYMERS OF POLYPROPYLENE AND OTHER POLYMERS AND PROCESS FOR PREPARING THE SAME
Harry W. Coover, Jr., Marvin A. McCall, and James E. Guillet, Kingsport, Tenn., assignors to Eastman Kodak Company, Rochester, N.Y., a corporation of New Jersey
No Drawing. Filed May 3, 1960, Ser. No. 26,419
15 Claims. (Cl. 260—45.5)

This invention relates to a broad class of novel polymeric products possessing numerous valuable properties. In another aspect the present invention relates to a novel and useful process for "tailoring" polypropylene to form the aforementioned broad class of compounds. More particularly, this invention relates to a method for "tailoring" polypropylene resins to increase their value and versatility by thermally treating polypropylene in the presence of a modifying polymer.

Many methods have been developed for the preparation of polypropylene products having properties peculiar to a specific use. For example, prior art workers have attempted to "customize" or "tailor" polypropylene, i.e. to impart certain properties to polypropylene to suit it to particular uses, by such methods as polymerization control, copolymerization, cracking, blending, compounding, cross-linking and powdering. However, except for a few noteworthy methods, the state of the art has not advanced sufficiently to permit the preparation and separation of "tailor-made" polymers from polypropylene having a desired combination of characteristics. It is evident, therefore, that the state of the art will be greatly enhanced by providing a class of "tailor-made" polymers from polypropylene capable of meeting specific requirements. Likewise, a noteworthy contribution to the art will be a method for the preparaion of such products.

It is known that polymeric materials can be degraded thermally at temperatures above 250° C., into lower molecular weight materials. Most polymers degrade into lower molecular weight fragments by one or two or a combination of two mechanisms. By one mechanism the polymer tends to "unzip" splitting off monomer units from the larger polymer molecule. By the other mechanism the polymer tends to break into larger fragments containing many monomer units. In the latter process the splitting may be a random splitting or the breaks may come at certain weak links in the polymer chain. Both of these thermal degradation processes are free-radical type processes. Polymers such as polystyrene, polymethyl methacrylate, and polymethylenediethyl malonate when heated at elevated temperatures degrade by an "unzipping" mechanism which yields large quantities of monomer but very little polymeric residue if carried to completion. In this case the molecular weight of the residual polymer is nearly independent of the percent degradation indicating that once the degradation starts in a particular chain the whole chain degrades completely to monomer [see Jellinek, "The Degradation of Vinyl Polymers" (Academic Press), page 68].

We have now made the surprising discovery that when such polymers are degraded in the presence of polypropylene the course of reaction is altered and extended blocks of these polymers apparently become chemically attached to polypropylene chains with only a relatively small amount of monomer being formed in the process. The reason for this unexpected behavior is not known. Not only does the characteristic degradation of polymer change, but the degradation rate of polypropylene is also altered, frequently being much slower than when carried out in the absence of other polymer. Utilizing this discovery, we have been able to "customize" or "tailor" polypropylene. Accordingly, specific desirable characteristics are combined with those of polyproylene by merely making a judicious choice of conditions of thermal treatment and polymeric modifier in thermally treating a mixture of the two.

It is well known in the art that high molecular weight polypropylene has many desirable properties which make it useful as a molding and coating material. For many applications, however, high molecular weight polypropylene has certain undesirable properties which limit its usefulness. For example, considerable difficulty is encountered in printing or dyeing polypropylene, also considerable difficulty is often encountered because polypropylene does not adhere to certain material as well as is desired. It is also known that polypropylene is not very compatible with many resins, waxes, oils and additives used in many coating operations and in many wax and grease formulations, thus limiting its use. In addition, in the paper coating industry considerable difficulty is encountered as a result of its high melt viscosities. However, the instant invention now provides new thermally created polymers and a method for their production which substantially overcomes these aforementioned difficulties.

It is, therefore, evident that an object of our invention is to prepare polymeric materials from polypropylene products having improved value and versatility.

Another object of our invention is to provide a method for the preparation of such compounds.

Still another object of this invention is to provide a method for producing polymeric products having a wide range of properties ranging from those of low molecular weight waxes to high molecular weight molding and coating materials.

Other important objects of the instant invention will become apparent from the discussion hereinafter.

In accordance with this invention it has been found that a mixture comprising about 5 to about 95% by weight of polypropylene and about 95 to about 5% of a modifying polymer, as hereinafter described, can be thermally treated at a temperature within the range of about 275 to about 450° C. for periods of from one minute to several hours to form novel polymeric products having improved clarity, tensile strength, elongation, grease and oil resistance, dyeability of fibers, as well as many other desirable characteristics.

Since any combination from about 5 to about 95% polypropylene and about 95 to about 5% of a modifying polymer can be used in the practice of this invention, there becomes available to the art a process which offers broad possibilities for modification of the properties of polypropylene. Such a process of thermal treatment allows the polypropylene to be "tailored" for many new and specific uses that were not possible using polyproylene alone or mixtures of polypropylene with other polymers or of conventional copolymers of the same composition. This becomes readily apparent from the fact that properties of the new and useful polymers are different from those obtained when a single propylene polymer is thermally modified to the same degree. The properties are also different from those of mechanical mixtures of the two thermally modified polymers and from copolymers having the same over-all composition. Hence, many properties of polypropylene such as hardness and softening point may be either increased or decreased simply by judiciously choosing the right combination of polymeric materials to be thermally treated.

In accordance with this invention polymers having a diversity of desirable characteristics can be obtained. Hence, the products of our invention, in general, will exhibit one or more improved properties including improved grease and oil resistance, dyeability of fibers and films, heat sealing properties in wax formulations, adhesion to paper, clarity, tensile strength and elongation, as well as improved stability to crystallization which often causes polypropylene coated paper to flake off on aging. Those properties are not obtained by normal extrusions or processing temperature controls now employed in the art. In addition, the compatibility of these new thermally created polymers are generally increased in paraffin, oils, resins, soaps and the like. For example, the cloud point, which is a measure of compatibility of the new thermally created polymers in paraffin mixtures, is considerably lower than that obtained with unmodified polypropylene or a simple mechanical mixture or propylene with the same modifying polymer. Moreover, it is possible to form waxes which are emulsifiable by merely making a proper choice of modifier. This is a very significant feature of the invention since, prior to this invention it was thought necessary to degrade and then oxidize polypropylene to form an emulsifiable wax. Furthermore, the properties of the new thermally created polymers are distinctly different from those obtained by simple mechanical blends or conventional copolymers of the same over-all composition. In general, these new products give higher melting points then copolymers of similar composition and also show improved flexibility with a minimum of crazing as compared with mixtures having the same percentage composition.

The products of our invention which can be obtained as low molecular weight waxes can be used to coat paper to produce a coated material with improved heat sealing properties due to a lowering of the embrittlement tendency possessed by conventional polypropylene waxes or mechanical mixtures of polypropylene wax with paraffin or other natural waxes. Hence, these new low molecular weight thermally modified propylene polymers are useful as substitutes for more expensive vegetable and mineral waxes, additives to other waxes, polymers and greases, coating materials for paper, cloth, wood, metal and synthetic materials.

According to the practice of this invention, the polymeric modifiers which can be used include homo- or copolymers of specific unsaturated polymerizable compounds containing at least one —CH=C> or more particularly a $CH_2=C<$ group. The α-olefins included within this class of monomers include those represented by the formula:

$$CH_2=CRR'$$

wherein R is an aliphatic or aromatic hydrocarbon containing 2 to 20 carbon atoms and R' is hydrogen or methyl.

Additional polymers which can be employed as modifiers in the practice of this invention include homo- or copolymers derived from monomers represented by the following general formulas:

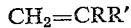

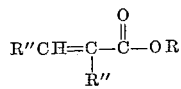

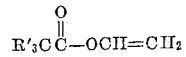

and

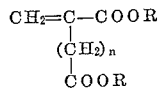

wherein R is a lower alkyl group desirably containing 1 to 8 carbon atoms, R' is hydrogen, halogen, alkyl or a lower alkoxy group desirably containing 1 to 8 carbon atoms, R" is hydrogen or methyl, R'" is aryl or alkaryl and $n$ is an integer from 0 to 1.

Hence, operative polymeric modifiers include those derived from one or more ethylenically unsaturated polymerizable monomers such as vinyl esters, vinyl ethers, α-β-unsaturated acid esters, olefins, acrylates, methacrylates, malonates and itaconates as exemplified by butene, isobutene, 3-methyl butene, 4-methyl pentene; hexene-1, heptene, dodecene, pentadiene, butadiene, isoprene, allene, neopentylbutadiene, 2,3-dimethyl butadiene 1,3-hexadiene, n-butyl acrylate, t-butyl methacrylate, styrene, α-methyl styrene isopropyl acrylate, p-isopropylstyrene, octadecene, vinyl acetate, vinyl allyl ether, vinyl n-butyl ether, vinyl t-butyl ether, vinyl ethyl ether, vinyl isobutyl ether, vinyl isopropyl ether, vinyl methyl ether, vinyl monochloroacetate, vinylnaphthalene, vinylphenanthrene, vinyl propyl ether, vinyl stearyl ether, vinyl methoxy acetate, vinyl 2-methoxyethyl ether, vinyl-2-chloroethyl ether, methylene diethyl malonate, diethyl itaconate, vinyl benzoate and the like.

It is obvious that the polymeric modifiers used in the practice of this invention are quite numerous and represent a wide variety of different materials. In general, however, these modifiers are characterized by a molecular weight of at least 10,000 and a density in the range of about 0.8 to about 1.8.

The propylene homopolymers used as starting materials in the practice of this invention include amorphous polypropylene as well as high-density polypropylene and therefore they will have a density of at least 0.88 and more preferably a density in the range of about 0.88 to about 0.93. The minimum molecular weight will be about 10,000 with an inherent viscosity of at least 0.7.

The characteristics of the new polymers obtained in the instant invention can be varied over a wide range and will, to a large extent, be determined, by the conditions of treatment as well as the particular starting materials employed. In general, however, the products obtained will range from waxes with molecular weights as low as 500 to rigid plastics having molecular weights of 100,000 or higher. Accordingly, the inherent viscosities can range from 0.1 or less to 3.0 or more. The densities of the products will depend upon the densities of the polypropylene and modifier and, in general, will be slightly greater than the weight average of the densities used in the starting mixture before thermal modification.

According to this invention, it is preferred that the thermal modification be effected in the absence of air. This can be accomplished by carrying out the treatment in vacuum or in an inert gas such as nitrogen and the like, in bulk or in the presence of a suitable diluent such as hexane, mineral spirits, benzene, xylene or the like at a temperature which is above the "threshold temperature" for thermal cracking of polypropylene, i.e. above about 275° C. Excellent results are achieved by treating a mixture comprising 5–95%, or more preferably 50–90% polypropylene and 95–5% or 50–10% of modifying polymer under conditions such that the molecular weight of polypropylene, if treated in the absence of modifier, would be decreased at least 10% and preferably 50% or more. In general, it has been found that temperatures within the range of about 275 to about 450° C. and more preferably in the range of about 290 to about 400° C. will achieve the desired results. The time required for the thermal modification will vary widely from periods of several minutes to several hours depending upon such variable factors as the temperature employed, as well as the molecular weights of the polymers employed, the desired characteristics to be achieved and similar variable factors. Thus, the molecular weight of the product can be changed by variation in the temperature or time of heating, higher temperatures leading to lower molecular weight products. Consequently, the time of heating, in a specific situation, will depend upon the correlation of the several variable factors. However, it has been found that heating periods ranging from about 1 minute to about 4 hours or more, within the temperature range set forth hereinabove, will achieve the desired results.

The thermally created polymers embodying this invention can be prepared by heating in any desired manner using conventional equipment, and the preparation is adapted for either batch or continuous operation. In a continuous process it is desirable to extrude the mixture of polypropylene and modifier in a conventional extruder into a heated zone where it is maintained at the desired temperature for periods of from 1 minute to several hours in order to achieve the desired degree of modification. Likewise, the heating can be carried out in a flowing stream reactor such as a tubular reactor if desired or can be effected in an inert hydrocarbon solvent, either batchwise or in a continuous flowing stream process. Although the preferred method of carrying out the process of this invention involves the use of a thermal treatment at a temperature above the "threshold temperature" it is to be understood that the scope of the invention is not limited thereto since other methods, e.g. mechanical degradation or the application of high shear to the molten mixture, can be employed to effect the desired modification.

The preparation of typical thermally created polymers embodying the invention is illustrated by the following examples, but it will be understood that these examples are merely illustrative and not intended to limit the scope of the invention unless otherwise specified.

EXAMPLE 1

Fifty grams of polypropylene (I.V. 3.2) was melted and blended with 50 g. of polystyrene under nitrogen. The temperature was gradually raised from 275° C. to 325° C. and held at this temperature with stirring for 4 hr. Some monomeric or low-boiling materials distilled from the reaction mixture. The resulting product was dissolved in hot benzene and poured into butyl acetate, then filtered. The product had an improved Durometer hardness of D80 as compared to D75 for pure polypropylene. A small sample of the above thermally modified material was dissolved in hot benzene, reprecipitated with butyl acetate several times, and analyzed by infrared. This analysis indicated the presence of polystyrene groups in the polymer and the composition was unchanged by successive fractionation indicating that the new thermally modified material was not a simple mechanical mixture. Pure polystyrene is soluble in butyl acetate and would be removed from the polypropylene by this treatment if present as a simple mechanical mixture.

EXAMPLE 2

Polypropylene (180 g., I.V. 3.2, crystalline M.P. 175° C.) was blended with 20 g. of poly-3-methyl butene (crystalline M.P. 245° C.) and heated to 325° C. under nitrogen over a period of 1 hr. The product had a greatly increased softening point (crystalline melting point was in the 190–200° C. range while the mechanical mixture of these materials had a very wide crystalline melting point range of 160 to 230° C.). This improved property of higher softening point is a valuable property in polypropylene fibers since higher ironing temperatures can be obtained.

EXAMPLE 3

Polypropylene (160 g., I.V. 3.2, density 0.91) and polyhexene-1 (40 g., I.V. 1.5) were blended together then heated from 180° to 390° C. for 45 minutes with vigorous stirring. The resulting thermally modified material had an I.V. of 1.6 and much greater flexibility and elongation than conventional polypropylene. This increased flexibility was accompanied by a minimum of crazing or blushing whereas when a simple mixture of these materials was prepared the material crazed and blushed badly when flexed.

The data in Table 1 shows clearly the unique properties of this thermally modified polymer over blends and copolymers of the same over-all chemical composition. The simple mechanical blend has lower stiffness, tensile strength, impact strength, and elongation than the thermally modified resin. A copolymer of the same ratio of hexene-1 to propylene has equivalent impact strength and elongation but is much lower in stiffness. The desirable qualities of high stiffness combined with good impact strength make the thermally modified resin of special value for injection molding and film applications.

EXAMPLE 4

Polypropylene (200 g., I.V. 3.2, density 0.91) was blended on hot rolls with 10 g. of polyisobutylene. This thoroughly mixed material was then heated to form 250–300° C. under nitrogen with stirring for 20 minutes. The product had an inherent viscosity of 1.7 and could be injection molded to give products with improved toughness and flexibility.

EXAMPLE 5

Polypropylene (450 g., I.V. 3.0) was blended with a copolymer (50 g., I.V. 1.4) containing 4% butene-1 and 96% ethylene. This blend was thermally modified by heating to 300° C. in a 1000 cc., three-neck flask while stirring under 1 mm. pressure for 30 minutes. A small amount of volatile material was removed during this operation. The resulting new polymer had an I.V. of 1.4.

Films of the three resins were extruded from a flat die through a water quench bath situated 1 inch from the die face. The improvement in film transparency and elongation, which is a measure of toughness, illustrates the desirable characteristics of the thermally modified resins as compared to simple blends of the two components. The properties of the blend are contrasted with the thermally modified polypropylene in Table 2.

EXAMPLE 6

Polypropylene (150 g., I.V. 3.2) was melted and blended with polymethyl methacrylate (100 g.) then heated to 285–295° C. over a period of about 1 hr. under nitrogen. The temperature was gradually increased to 325° C. and held at this temperature for 2 hrs. Some monomeric material distilled out of the molten mixture. Oxygen analysis indicated approximately 12½% of the thermally modified polymer was made up of polymethyl methacrylate units. This crude material was dissolved in hot benzene and then precipitated with acetone and washed repeatedly with hot acetone to remove any uncombined polymethyl methacrylate. This operation was continued until the wash acetone contained no soluble polymer. This could be determined by evaporating small quantities of the acetone filtrate. Approximately 100 g. of this new thermally modified polymer (molecular weight of 5,600 containing 2.2% oxygen, approximately 6.2% of the purified thermally modified polymer was made up of polymethyl methacrylate units) was hydrolyzed by first dissolving in hot benzene on the steam bath. To this solution was added 125 cc. of methyl alcohol. Twenty-five grams of KOH dissolved in an additional 125 cc. of methyl alcohol was then added producing a milky solution which was heated on the steam bath for approximately 3 hr., then diluted with water and allowed to stand overnight. The hydrolyzed polymer was then isolated by decanting the liquid and washing several times with water and finally acidified on the steam bath then filtered and washed free of HCl. The new thermally modified polymer was melted and titrated. It was found to have an acid number of 8.2, penetration hardness of zero on the 100-g. scale for 5 sec. This materail could be emulsified in water and was suitable for use as floor polish.

A mechanical blend of polypropylene and polymethyl methacrylate was prepared from 6.2 g. of polymethyl methacrylate and 93.8 g. of polypropylene. This was the equivalent composition of the purified thermally modified polymer. This material was blended carefully by melting (185–200° C.) and stirring until a uniform mixture was obtained. At this temperature the resulting product was essentially a mechanical mixture. This was demonstrated by an experiment in which the two components could be completely separated by the process of dissolving in hot benzene and precipitating with acetone as described above. The acetone insoluble fraction gave a material with an acid number of zero after carrying out the hydrolysis step as described above, which product could not be emulsified.

EXAMPLE 7

In a similar procedure to that described in Example 6, polypropylene (2000 g., I.V. 2.02) was heated with 1000 g. of polyvinyl acetate and blended to give a uniform mechanical blend then heated to 310° C. for 2 hr. with stirring under nitrogen. The thermally modified wax had an I.V. of 0.54 and was coated on a roll of kraft paper from a melt at 190° C. and quenched rapidly with a chrome plated calendar roll. The resulting coating was tough and flexible and could be heat sealed without embrittlement. A simple mechanical mixture of pure polypropylene (200 g., I.V. 0.5) and polyvinyl acetate (100 g.) was found to separate out into two phases after standing in the melted state which rendered it unsuitable for use as a coating material.

The thermally modified material made from polypropylene and polyvinyl acetate as described above was also found to adhere to the paper better than unmodified polypropylene. The thin film of thermally modified polymer was tough and had improved grease retention when compared to a similarly coated polyethylene paper. The degree of grease retention was determined by a modification of Army JAN–B–121 test in which turpentine as well as cotton seed oil was used as the test liquid on the creased paper.

Other polyvinyl esters such as polyvinyl methoxy acetate and polyvinyl stearate were also used to prepare similar thermally modified polypropylene. These materials also had excellent paper coating properties. The special properties of adherence, grease retention and heat sealability were superior to those obtained with polypropylene alone or with mechanical blends of polypropylene and these vinyl polymers. The tendency of these thin films of thermally modified polymer on paper to crystalline and flake off was greatly reduced. A comparative test of coated paper was carried out by aging in an air circulating oven at 80° C. The coated paper was examined periodically for cracking and flaking off of the polymer film.

EXAMPLE 8

Five hundred fifty grams of poly-2-ethylhexyl vinyl ether was blended with 550 g. of polypropylene (I.V. 2.02). This mechanical blend was heated with stirring to 305° C. for 2 hr. under nitrogen. The product was a uniform polymeric material that could be coated onto paper by the conventional hot melt process to give a film that had excellent heat sealing properties. The wax coating could not be separated from the paper as is often observed when plain polypropylene is used as the coating material.

Similar runs using polyvinyl 2-methoxyethyl ether and polyvinyl 2-chloroethyl ether instead of poly-2-ethylhexyl vinyl ether in thermally modifying polypropylene also produced excellent coating materials that had excellent adhesion to the paper. These thermally modified materials did not separate out on standing in the melt as was observed when simple blends or mechanical mixtures were prepared.

EXAMPLE 9

Polypropylene (480 g., I.V. 3.2) was thermally modified with 120 g. of polymer obtained by polymerizing methylene diethyl malonate. The thermal modification was in the 275–300° C. range for 45 min. under nitrogen. The resulting new thermally modified polymer was then spun into fibers. These fibers were found to be dyeable by regular disperse type dyes such as 4-(4′-β-hydroxyethylanilino)-5-nitro-1,8-dihydroxy-antraquinone. Thin films could also be prepared and printed when made from this thermally modified material.

EXAMPLE 10

Another thermally modified polymer was obtained from polypropylene (594 g., I.V. 3.2) and 6 g. of polymeric diethyl itaconate by heating in the 280–295° C. range for 1 hr. This thermally modified product showed improved dyeing properties when compared with similarly treated polypropylene.

EXAMPLE 11

Polypropylene (520 g., I.V. 3.2) and 80 g. of polybutyl acrylate were thermally modified by heating at 280–305° C. for ¾ hr. The thermally modified polymer had improved dyeing properties as compared with a similarly treated polypropylene that had not been thermally treated with polybutyl acrylate or as compared with a mechanical mixture of the two materials.

EXAMPLE 12

A copolymer of vinyl acetate and vinyl benzoate (85–15) was prepared and then blended with polypropylene (I.V. 3.0) in a 20–80 weight ratio. This blend was heated within the 290–360° C. range for ¾ hr. under nitrogen. The new product was homogeneous, did not separate on melting, and showed improved dye absorption when compared with polypropylene fibers and films.

The unusual combination of physical characteristics evidenced by some of the thermally created polypropylene products embodying the invention is shown by the data summarized in Tables 1 and 2 which follow. From an examination of this data it is obvious that new thermally created polypropylene products are endowed with characteristics which are distinctly different and superior in many respects to many of the polypropylene products now available.

*Table 1*

|  | Stiffness Modulus, p.s.i. | Tensile Strength | Elongation, percent | Izod Impact, ft. lb./in Notch |
| --- | --- | --- | --- | --- |
| Polypropylene | 170,000 | 4,950 | 320 | 0.8 |
| 80% Polypropylene, 20% polyhexene-1 (thermally modified) | 104,000 | 3,400 | 720 | 6.2 |
| 80% Polypropylne, 20% polyhexene-1 blend | 90,000 | 2,900 | 50 | 1.2 |
| Copolymer, 80% propylene, 20% hexene-1 | 10,000 | 3,180 | 710 | 12.0 |

*Table 2*

|  | Stiffness Modulus, p.s.i. | Tensile Strength | Elongation, percent | Film Transparency, in. |
| --- | --- | --- | --- | --- |
| Blend, 90% polypropylene and 10% copolymer (4% butene-1, 96% ethylene) | 125,000 | 3,540 | 40 | 10 |
| Thermally modified, 90% polypropylene and 10% copolymer (4% butene-1, 96% ethylene) | 110,000 | 4,200 | 310 | 250 |

Thus, by means of this invention it is possible to "customize" or "tailor" polypropylene for a specific use by merely making a judicious choice of modifier. According to this invention it is possible to improve one or more of the characteristics of polypropylene to increase its value and versatility. Hence, propylene polymers available in the prior art can be improved in one or more characteristics such as grease and oil resistance, dyeability of fibers and films, printability of films, heat sealing properties in wax formulations, adhesion to paper, clarity, tensile strength, elongation, penetration hardness of a wax, compatibility and the like. The improved polymers can, of course, be substituted for conventional polypropylene whenever these improved properties are of significance. For example, the low molecular weight wax products of this invention, as pointed out hereinabove, can be used as paper coatings in the conventional manner. However, these coatings possess improved heat sealing properties over unmodified polypropylene waxes due to a lowering of the embrittlement tendency which is characteristic of conventional polypropylene wax or mechanical mixtures of propylene wax with paraffin or other natural waxes.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. The method of tailoring polypropylene to increase its value and versatility which comprises degrading by heating, at a temperature in the range of about 275° to about 450° C., for at least one minute, a mixture comprising about 5 to about 95%, by weight, of solid polypropylene resin and about 5 to about 95%, by weight, of a modifier selected from the group consisting of (1) a polymer of a compound having the formula:

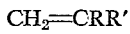

where R is a member selected from the group consisting of aliphatic and aromatic hydrocarbon radicals containing 2–20 carbon atoms, R' being a member selected from the group consisting of hydrogen and methyl, (2) a polymer of an unsaturated polymerizable compound having the formula:

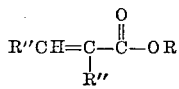

(3) a polymer of an unsaturated polymerizable compound having the formula:

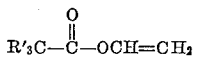

(4) a polymer of an unsaturated polymerizable compound having the formula:

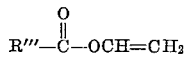

(5) a polymer of an unsaturated polymerizable compound having the formula:

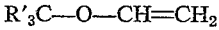

and (6) a polymer of an unsaturated polymerizable compound having the formula:

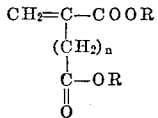

where, in (2), (3), (4), (5) and (6), R is an alkyl radical containing 1–8 carbon atoms, R' is a member selected from the group consisting of hydrogen, halogen, alkyl and alkoxy radicals containing 1–8 carbon atoms, R" is a member selected from the group consisting of hydrogen and methyl, R'" is a member selected from the group consisting of aryl and alkaryl radicals and $n$ is an integer from 0–1, inclusive.

2. The process according to claim 1 wherein the heating takes place at a temperature in the range of about 290° to about 400° C.

3. The method of tailoring polypropylene to increase its value and versatility which comprises degrading by heating, in the absence of air, at a temperature in the range of about 275° to about 450° C., for a period of time in the range of one minute to about four hours, a mixture comprising about 5 to about 95%, by weight, of solid polypropylene resin and about 5 to about 95%, by weight, of a solid modifier selected from the group consisting of (1) a polymer of a compound having the formula:

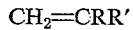

where R is a member selected from the group consisting of aliphatic and aromatic hydrocarbon radicals containing 2–20 carbon atoms, R' being a member selected from the group consisting of hydrogen and methyl, (2) a polymer of an unsaturated polymerizable compound having the formula:

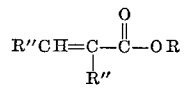

(3) a polymer of an unsaturated polymerizable compound having the formula:

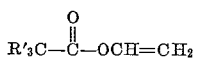

(4) a polymer of an unsaturated polymerizable compound having the formula:

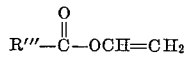

(5) a polymer of an unsaturated polymerizable compound having the formula:

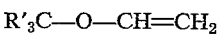

and (6) a polymer of an unsaturated polymerizable compound having the formula:

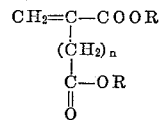

where, in (2), (3), (4), (5) and (6), R is an alkyl radical containing 1–8 carbon atoms, R' being a member selected from the group consisting of hydrogen, halogen, alkyl and alkoxy radicals containing 1–8 carbon atoms, R" is a member selected from the group consisting of hydrogen and methyl, R'" is a member selected from the group consisting of aryl and alkaryl radicals and $n$ is an integer from 0–1, inclusive.

4. The method of tailoring polypropylene to increase its value and versatility which comprises degrading by heating, at a temperature in the range of about 275° to about 450° C., for a period of time in the range of about one minute to about four hours, a mixture comprising about 5 to about 95%, by weight, of solid polypropylene resin and about 5 to about 95%, by weight, of a solid modifier which is a polymer of a compound having the formula:

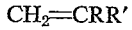

where R is a member selected from the group consisting of aliphatic and aromatic hydrocarbon radicals containing 2–20 carbon atoms, R' being a member selected from the group consisting of hydrogen and methyl.

5. The method of tailoring polypropylene to increase its value and versatility which comprises degrading by heating, at a temperature in the range of about 275° to about 450°C., for a period of time in the range of about one minute to about four hours, a mixture comprising about 5 to about 95%, by weight, of solid polypropylene resin and about 5 to about 95%, by weight, of a solid modifier which is a polymer of an unsaturated polymerizable compound having the formula:

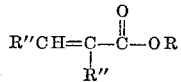

wherein R is a lower alkyl group containing 1–8 carbon atoms and R″ is a member selected from the group consisting of hydrogen and methyl.

6. The method of tailoring polypropylene to increase its value and versatility which comprises degrading by heating, at a temperature in the range of about 275° to about 450° C., for a period of time in the range of about one minute to about four hours, a mixture comprising about 5 to about 95%, by weight, of solid polypropylene resin and about 5 to about 95%, by weight, of a solid modifier which is a polymer of an unsaturated polymerizable compound having the formula:

$$R'_3C-\underset{\underset{O}{\parallel}}{C}-OCH=CH_2$$

wherein R is a member selected from the group consisting of hydrogen, halogen, alkyl and lower alkoxy radicals containing 1–8 carbon atoms.

7. The method of tailoring polypropylene to increase its value and versatility which comprises degrading by heating, at a temperature in the range of about 275° to about 450° C., for a period of time in the range of about one minute to about four hours, a mixture comprising about 5 to about 95%, by weight, of solid polypropylene resin and about 5 to about 95%, by weight, of a solid modifier which is a polymer of a compound having the formula:

$$R'''-\underset{\underset{O}{\parallel}}{C}-OCH=CH_2$$

wherein R‴ is a member selected from the group consisting of aryl and alkaryl radicals.

8. The method of tailoring polypropylene to increase its value and versatility which comprises degrading by heating, at a temperature in the range of about 275° to about 450° C., for a period of time in the range of about one minute to about four hours, a mixture comprising about 5 to about 95%, by weight, of solid polypropylene resin and about 5 to about 95%, by weight, of a solid modifier which is a polymer of a compound having the formula:

$$R'_3C-O-CH=CH_2$$

wherein R′ is a member selected from the group consisting of hydrogen, halogen, alkyl and alkoxy radicals containing 1–8 carbon atoms.

9. The method of tailoring polypropylene to increase its value and versatility which comprises degrading by heating, at a temperature in the range of about 275° to about 450° C., for a period of time in the range of about one minute to about four hours, a mixture comprising about 5 to about 95%, by weight, of solid polypropylene resin and about 5 to about 95%, by weight, of a solid modifier, which is a polymer of an unsaturated polymerizable compound having the formula:

$$CH_2=C-COOR$$
$$|$$
$$(CH_2)_n$$
$$|$$
$$C-OR$$
$$\parallel$$
$$O$$

wherein R is a lower alkyl group containing 1–8 carbon atoms and $n$ is an integer from 0 to 1.

10. The method according to claim 4 wherein the modifier is polyhexene-1.

11. The method according to claim 4 wherein the modifier is polystyrene.

12. The method according to claim 5 wherein the modifier is polymethyl methacrylate.

13. The method according to claim 4 wherein the modifier is poly-3-methyl butene.

14. The method according to claim 4 wherein the modifier is a copolymer comprising 4%, by weight, butene-1 and 96%, by weight, ethylene.

15. The product obtained by the process of claim 1.

References Cited in the file of this patent

UNITED STATES PATENTS

| | | |
|---|---|---|
| 2,554,259 | Mikeska et al. | May 22, 1951 |
| 2,661,335 | Butler | Dec. 1, 1953 |

OTHER REFERENCES

Madorsky et al.: (Natl. Bur. Standards, Washington, D.C.), J. Research Natl. Bur Standards, 53, 361–70 (1954) (Research Paper No. 2553).